(12) United States Patent
Morley et al.

(10) Patent No.: US 11,593,189 B1
(45) Date of Patent: Feb. 28, 2023

(54) CONFIGURING NEW STORAGE SYSTEMS BASED ON WRITE ENDURANCE

(71) Applicant: Dell Products L.P., Round Rock, TX (US)

(72) Inventors: Steven A. Morley, Mendon, MA (US); Amitai Alkalay, Kadima (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/576,140

(22) Filed: Jan. 14, 2022

(51) Int. Cl.
| | | |
|---|---|---|
| *G06F 11/34* | (2006.01) | |
| *G06F 11/00* | (2006.01) | |
| *G06F 11/30* | (2006.01) | |

(52) U.S. Cl.
CPC ........ *G06F 11/008* (2013.01); *G06F 11/3034* (2013.01); *G06F 11/3442* (2013.01); *G06F 11/3457* (2013.01)

(58) Field of Classification Search
CPC .............. G06F 11/008; G06F 11/3442; G06F 11/3457; G06F 11/3034; G06F 3/0629; G06F 3/0631; G06F 3/0632; G06F 3/0653
See application file for complete search history.

(56) References Cited

U.S. PATENT DOCUMENTS

| | | | |
|---|---|---|---|
| 10,552,056 B2 | 2/2020 | Marchenko et al. | |
| 10,585,605 B1 | 3/2020 | Khokhar et al. | |
| 10,613,790 B1 | 4/2020 | Armangau et al. | |
| 2017/0068457 A1* | 3/2017 | Sunaga | G06F 3/0619 |
| 2018/0129448 A1* | 5/2018 | Duzly | G06F 3/0616 |
| 2018/0284997 A1 | 10/2018 | Dalmatov | |
| 2019/0042126 A1* | 2/2019 | Sen | G06F 12/06 |
| 2020/0042193 A1* | 2/2020 | Dalmatov | G06F 3/0631 |
| 2020/0409568 A1* | 12/2020 | Gupta | G06F 3/0629 |
| 2022/0107733 A1* | 4/2022 | Trika | G06F 3/0607 |

* cited by examiner

*Primary Examiner* — Yolanda L Wilson
(74) *Attorney, Agent, or Firm* — BainwoodHuang

(57) ABSTRACT

A method performed by a computing device, of configuring a new design of a new data storage system (DSS) having initial configuration parameters is provided. The new design includes an initial plurality of storage drives. The method includes (a) collecting operational information from a plurality of remote DSSs in operation, the operational information including numbers of writes of various write sizes received by respective remote DSSs of the plurality of remote DSSs over time; (b) modeling a number of drive writes per day (DWPD) of the initial plurality of storage drives of the new DSS based on the collected operational information from the plurality of remote DSSs and the initial configuration parameters; (c) comparing the modeled number of DWPD to a threshold value; and (d) in response to the modeled number of DWPD exceeding the threshold value, reconfiguring the new DSS with an updated design.

20 Claims, 5 Drawing Sheets

CONFIGURING NEW STORAGE SYSTEMS BASED ON WRITE ENDURANCE

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Large numbers of data storage systems are deployed around the world. Some of these data storage systems may periodically report telemetry to a monitoring server. For example, a manufacturer of data storage systems may configure its systems to periodically report to a monitoring server with various metrics so that the manufacturer can perform quality assessment and control.

SUMMARY

Many modern data storage systems employ solid state disk drives (SSDs). Given that SSDs typically have a limited number of program-erase cycles before they fail or become unreliable, it is important to carefully limit how much data is written to SSDs. Thus, manufacturers may assign a maximum Drive Writes Per Day (DWPD) rating to the SSDs that they produce. For example, a 15 TB SSD with a maximum DWPD rating of 1.0 is rated to write 15 TB per day over the course of its expected lifetime (e.g., 3 years) without a significant risk of failure, while a 10 TB SSD with a maximum DWPD rating of 0.5 is rated to write 5 TB per day.

When designing a new SSD-based storage system, it is important to consider what the expected number of DWPD will be for that storage system to ensure that the SSDs in that storage system do not fail prematurely. This is particularly essential when SSD technology experiences a large change, such as the switch from triple level cell (TLC) to quadruple level cell (QLC) SSD design. A typical enterprise TLC SSD may have a maximum DWPD rating around 1.0, while a typical enterprise QLC SSD may have a maximum DWPD rating around 0.2-0.5. Thus, QLC SSDs cannot necessarily substitute for TLC SSDs in storage systems. Instead, a new storage system design may be needed for QLC drives. In order to design and properly configure such a new storage system, typical storage usage patterns must be taken into consideration. When a monitoring server records telemetry from large numbers of storage systems, such information can also be utilized in the design and configuration of new storage systems.

Thus, it would be desirable to utilize telemetry from existing storage systems in the design and configuration of new data storage systems. Such use of telemetry may include creating a model of real-world usage patterns based on the telemetry using design parameters from a new data storage system. The model may be operated to determine whether a particular configuration of the new data storage system can meet a threshold DWPD value. If not, the model may be operated to generate a new configuration or a new design for the new data storage system. In some embodiments, the model assumes write patterns similar to those from storage systems of similar storage capacity as the new data storage system as tentatively configured. In some embodiments, the model calculates and applies write amplification corrections based on a design of the new data storage system.

In one embodiment, a method performed by a computing device, of configuring a new design of a new data storage system (DSS) having initial configuration parameters is provided. The new design includes an initial plurality of storage drives. The method includes (a) collecting operational information from a plurality of remote DSSs in operation, the operational information including numbers of writes of various write sizes received by respective remote DSSs of the plurality of remote DSSs over time; (b) modeling a number of drive writes per day (DWPD) of the initial plurality of storage drives of the new DSS based on the collected operational information from the plurality of remote DSSs and the initial configuration parameters; (c) comparing the modeled number of DWPD to a threshold value; and (d) in response to the modeled number of DWPD exceeding the threshold value, reconfiguring the new DSS with an updated design. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for utilizing telemetry from existing storage systems in the design and configuration of new data storage systems. Such use of telemetry may include creating a model of real-world usage patterns based on the telemetry using design parameters from a new data storage system. The model may be operated to determine whether a particular configuration of the new data storage system can meet a threshold Drive Writes Per Day (DWPD) value. If not, the model may be operated to generate a new configuration or a new design for the new data storage system. In some embodiments, the model assumes write patterns similar to those from storage systems of similar storage capacity as the new data storage system as tentatively configured. In some embodiments, the model calculates and applies write amplification corrections based on a design of the new data storage system.

Figure 1:
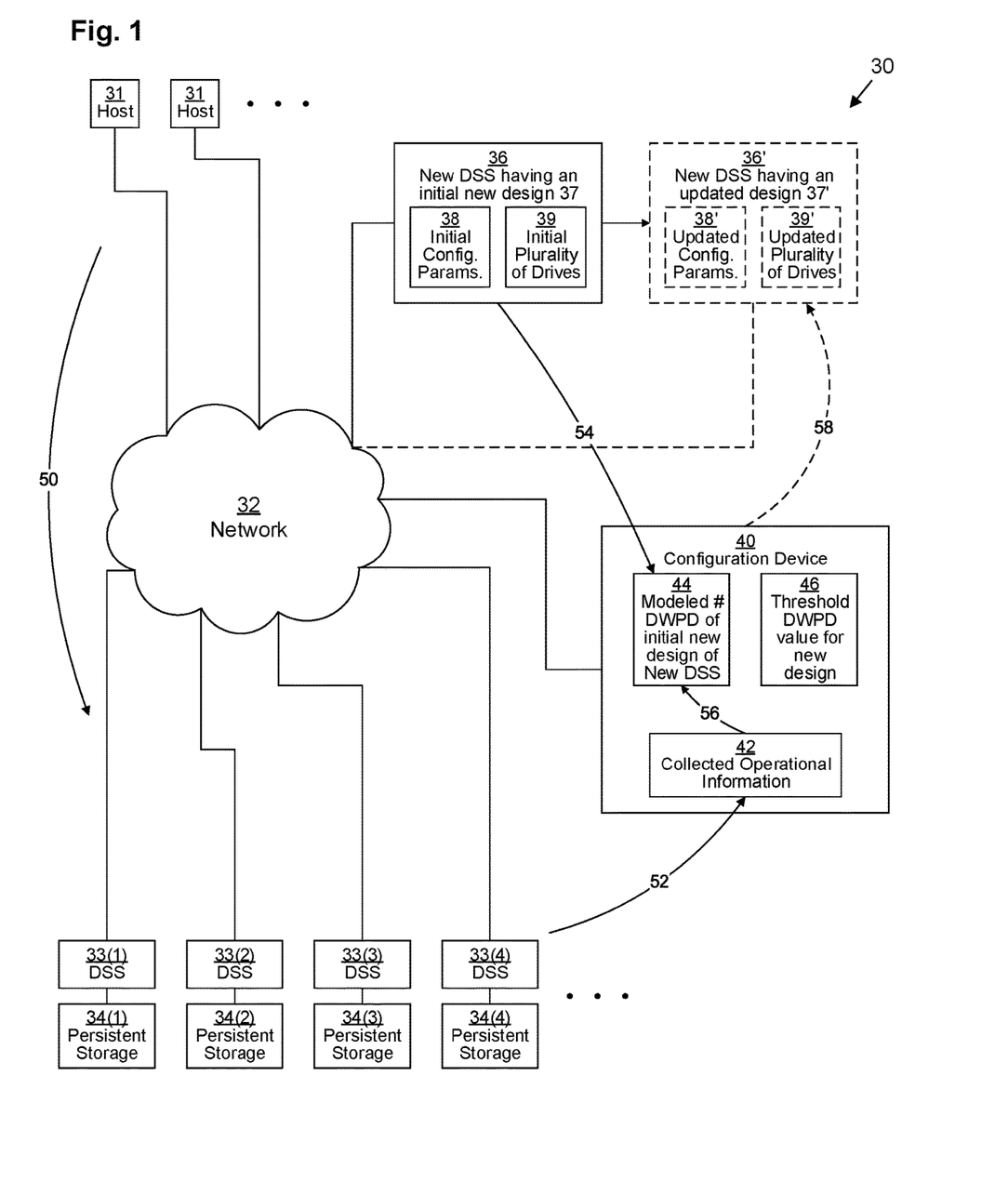
FIG. 1 is a block diagram depicting an example system, apparatus, and data structure arrangement for use in connection with various embodiments.

FIG. 1 depicts an example system 30 for use in connection with various embodiments. System 30 includes a set of host devices 31 connected to a set of data storage systems (DSSs) 33 (depicted as DSSs 33(1), 33(2), 33(3), 33(4), . . . ) via a network 32. Network 32 may be any kind of digital communications network, such as, for example, a LAN, WAN, SAN, the Internet, a wireless communication network, a virtual network, a fabric of interconnected switches, etc.

DSSs 32, also referred to as "remote DSSs," are computing devices that are configured to receive and process data storage requests with respect to attached persistent storage 34 (depicted as persistent storage 34(1), 34(2), 34(3), 34(4), . . . ) respectively associated with each DSS 33. Persistent storage 34 may be made up of one or more arrays (not depicted) of persistent storage devices (not depicted), such as, for example, hard disk drives, solid-state storage devices (SSDs), flash drives, etc. Persistent storage 34 is used for storing filesystems and/or logical disks hosted by their respective DSSs 33. In some embodiments, rather than being external to DSSs 33, persistent storage 34 may instead be part of DSSs 33.

System 30 also includes a configuration device 40 also connected to network 32 as well as a new DSS 36 having a new design 37 that is different than a preexisting design used for any of the remote DSSs 33. In some embodiments, new DSS 36 is also connected to network 32, while in other embodiments, new DSS is not connected to network 32 but is instead in communication with configuration device 40 by some other means. New DSS 36 is also a computing devices that is configured to receive and process data storage requests with respect to attached persistent storage (not depicted). Configuration device 40 may be any kind of computing device.

A computing device 31, 33, 36, 40 may be any kind of computing device, such as, for example, a personal computer, workstation, server computer, enterprise server, rack-mount server, data storage array device, laptop computer, tablet computer, smart phone, mobile computer, etc. Typically, host devices 31 and configuration device 40 are personal computers, workstations, laptop computers, or server computers, while DSSs 33 and new DSS 36 are enterprise servers, rack-mount servers, data storage array devices, etc., although this is by way of example only.

The new DSS 36 having the new design 37 includes initial configuration parameters 38 as well as an initial plurality 39 of storage drives. For example, the initial plurality 39 may be 25 storage drives (e.g., 15 terabyte [TB] SSDs employing QLC technology).

In operation, host devices 31 send data storage commands 50 to DSSs 33 for fulfillment with respect to persistent storage 34. Data storage commands 50 may include read commands as well as write commands. Periodically (e.g., once per minute, hour, day, etc.), DSSs 33 send telemetry 52 to configuration device 40, which records the telemetry 52 as collected operational information 42. Telemetry 52 from a given DSS 33(X) may include, for example, numbers of write operations received by that DSS 33(X) from hosts 31 broken down by size (for example, 100 512-byte writes, 500 1-kilobyte writes, 700 2-kilobyte writes, 25,000 4-kilobyte writes, . . . , 600 128-kilobyte writes, etc.), numbers of read operations received by that DSS 33(X) from hosts 31 broken down by size, the storage capacity of that DSS 33(X), the current storage utilization of that DSS 33(X), an amount of time that that DSS 33(X) has been operational, etc. In some embodiments, one or more of the DSSs 33 may include a plurality of storage processors (not depicted) configured to process access to persistent storage 34 in parallel with each other. In such arrangements, telemetry 52 may include separate numbers for each storage processor.

Configuration device 40 may then create a modeled number 44 of DWPD for the new DSS 36 based on input 56 from the collected operational information 42 as well as on information 54 received from the new DSS 36. Configuration device 40 may compare the modeled number 44 to a threshold DWPD value 46 for the new design 37. If the modeled number 44 exceeds the threshold DWPD value 46 (or, in some embodiments, even if it is less but within a threshold distance), then configuration device 40 will attempt to reconfigure the new DSS 36 by sending a reconfiguration command 58 that will cause the updated new DSS 36' to have an updated design 37' with updated configuration parameters 38' and/or an updated plurality 39' of drives.

Figure 2:
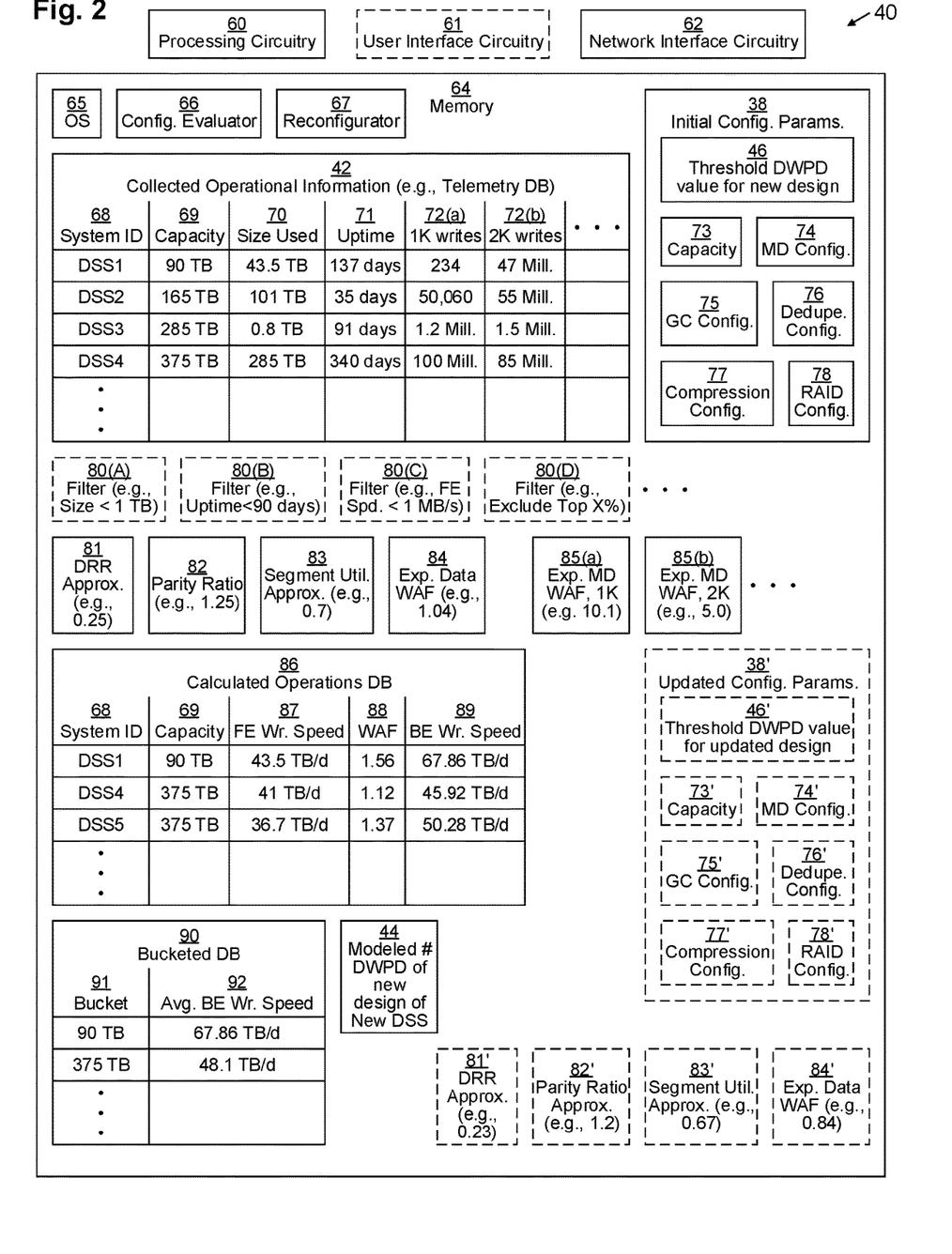
FIG. 2 is a block diagram depicting an example apparatus and data structure arrangement for use in connection with various embodiments.

Further detail with respect to an example configuration device 40 is provided in FIG. 2. As depicted, configuration device 40 includes network interface circuitry 62, processing circuitry 60, and memory 64. In some embodiments, configuration device 40 also includes user interface (UI) circuitry 61. Configuration device 40 may also include various other components that are not depicted, such as storage interface circuitry, caches, interconnection circuitry, a chassis, etc.

Processing circuitry 60 may include any kind of processor or set of processors configured to perform operations, such as, for example, a single- or multi-core microprocessor, a set of multiple microprocessors, etc.

Network interface circuitry 62 may include one or more Ethernet cards, cellular modems, Fibre Channel (FC) adapters, InfiniBand adapters, wireless networking adapters (e.g., Wi-Fi), and/or other devices for connecting multiple computing devices over a network connection, such as network 32. Network interface circuitry 34 allows computing devices 32 to communicate over the network connection. Network interface circuitry 62 allows configuration device 40 to communicate with DSSs 33 and with new DSS 36.

UI circuitry 61 may include circuitry for interfacing with one or more UI devices (not depicted) that allow one or more human agents to input and receive data to and from the configuration device 40. For example, UI circuitry 61 may include a serial bus adapter, a graphics adapter, etc., while the UI devices may include one or more of a display screen, a printer, a speaker, and an input device (e.g., a mouse, trackpad, tracking stick, keyboard, keypad, microphone, biometric sensor, etc.).

Memory 64 may be any kind of digital system memory, such as, for example, random access memory (RAM). Memory 40 stores an operating system (OS) 65 in operation (e.g., a Linux, UNIX, Windows, MacOS, or similar operating system). Memory 40 also stores a configuration evaluator 66 and a reconfigurator 67, which are software modules in operation.

Memory 64 also stores the collected operational information 42 in the form of a database (DB) as well as the modeled number 44 and the threshold DWPD value 46. The threshold DWPD value 46 may be included within the initial configuration parameters 38, as depicted.

As depicted, the collected operational information 42 takes the form of a telemetry DB that includes several columns for various types of data: a system identifier (ID) 68, capacity 69, size used 70, uptime 711, and a set of per-size write counts 72 (depicted as 1K writes 72(a), 2K writes 72(b), . . . ). The collected operational information 42 may also include various additional data columns to store additional data per DSS 33. In some embodiments the sizes of the write counts may range from 512 bytes (B) up through 2 megabytes (MB) with a column for each power of 2 in between. In other embodiments, some of the columns may be missing from the beginning and/or end. For example, in some embodiments, there may not be a column for 512 B or even 1 kilobyte (KB) or 2 KB. As another example, in some embodiments, there may not be a column for 256 KB, 512 KB, 1 MB, or 2 MB.

The system ID 68 serves to identify which DSS 33 a row contains telemetry 52 from. Thus, as depicted, the first four rows of the DB of the collected operational information 42 represent DSSs 33(1) (DSS1), 33(2) (DSS2), 33(3) (DSS3), and 33(4) (DSS4), respectively.

The capacity 69 represents the maximum storage capacity of each DSS 33. In an example embodiment, a DSS 33 includes a plurality of storage drives (e.g., SSDs) that all have the same capacity (e.g., 15 TB each). Thus, as depicted, DSS 33(1) has a total storage capacity 69 of 90 TB (6 drives), DSS 33(2) has a total storage capacity 69 of 165 TB (11 drives), DSS 33(3) has a total storage capacity 69 of 285 TB (19 drives), and DSS 33(4) has a total storage capacity 69 of 375 TB (25 drives).

The size used 70 represents the amount of the storage capacity of each DSS 33 that is currently in use. Thus, as depicted, DSS 33(1) has a size used 70 of 43.5 TB, DSS 33(2) has a size used 70 of 101 TB, DSS 33(3) has a size used 70 of 0.8 TB, and DSS 33(4) has a size used 70 of 285 TB.

The uptime 71 represents the amount of time that each DSS 33 has been in operation. Thus, as depicted, DSS 33(1) has an uptime 71 of 137 days, DSS 33(2) has an uptime 71 of 35 days, DSS 33(3) has an uptime 71 of 91 days, and DSS 33(4) has an uptime 71 of 340 days.

As depicted in FIG. 2, DSS 33(1) has received 234 1-KB writes 72(*a*) and 47 million 2-KB writes 72(*b*) during its 137 days of uptime 71; this implies a front-end (FE) write speed of at least 234×1 KB+47,000,000×2 KB/137 days≈7.94 KB/s. Similarly, as depicted in FIG. 2, DSS 33(2) has received 50,060 1-KB writes 72(*a*) and 55 million 2-KB writes 72(*b*) during its 35 days of uptime 71; this implies a front-end (FE) write speed of at least 50,060×1 KB+55,000,000×2 KB/35 days≈36.39 KB/s. Similarly, as depicted in FIG. 2, DSS 33(3) has received 1.2 million 1-KB writes 72(*a*) and 1.5 million 2-KB writes 72(*b*) during its 91 days of uptime 71; this implies a front-end (FE) write speed of at least 1,200,000×1 KB+1,500,000×2 KB/91 days≈547 B/s. Similarly, as depicted in FIG. 2, DSS 33(4) has received 100 million 1-KB writes 72(*a*) and 85 million 2-KB writes 72(*b*) during its 340 days of uptime 71; this implies a front-end (FE) write speed of at least 100,000,000×1 KB+85,000,000×2 KB/340 days≈9.19 MB/s. It should be understood that the actual FE write speed of DSSs 33(1), 33(2), 33(3), 33(4) may actually be much higher than these values because the per-size write counts 72 for larger write sizes is not shown.

Memory 64 also stores various values 81, 82, 83, 84, 85 that are derived from the initial configuration parameters 38. Configuration evaluator 66 uses the values 81, 82, 83, 84, 85 to generate calculated operations DB 86. Calculated operations DB 86 includes several columns for various types of data: a system identifier (ID) 68, capacity 69, FE write speed 87, per-DSS write amplification factor (WAF) 88, and back-end (BE) write speed 89. Due to the overlap in some of the columns 68, 69, in some embodiments (not depicted), calculated operations DB 86 may be combined into the same DB as the collected operational information 42.

Memory 64 also stores a bucketed DB 90 that is generated by configuration evaluator 66 sorting the DSSs 33 included in the calculated operations DB 86 into buckets 91 based on their capacity 69 and then storing an average 92 of the BE write speeds 89 for the DSSs 33 included in each bucket 91.

In some embodiments, memory 64 also stores various filters 80 (depicted as filters 80(A), 80(B), 80(C), 80(D), . . . ), which may be used to exclude some of the DSSs 33 from inclusion in the calculated operations DB 86 or to exclude some of the DSSs 33 from having their BE write speeds 89 included in the calculation for the average 92 of the BE write speeds 89.

For example, as depicted, filter 80(A) excludes the collected operational information 42 for any DSS 33 whose size used 70 is less than a threshold value, e.g., 1 TB. Application of this filter 80(A) results in the exclusion of the collected operational information 42 for DSS 33(3), so DSS3 does not appear within the calculated operations DB 86.

As another example, as depicted, filter 80(B) excludes the collected operational information 42 for any DSS 33 whose uptime 71 is less than a threshold value, e.g., 90 days. Application of this filter 80(B) results in the exclusion of the collected operational information 42 for DSS 33(2), so DSS2 does not appear within the calculated operations DB 86.

As another example, as depicted, filter 80(C) excludes the BE write speeds 89 for any DSS 33 whose FE write speed 87 is less than a threshold value, e.g., 1 MB/s, from being figured into the average 92 of the BE write speeds 89.

As another example, as depicted, filter 80(D) excludes BE write speeds 89 from being figured into the average 92 of the BE write speeds 89 for any DSS 33 whose FE write speed 87 is within the top X % (e.g., the top 5%) of all DSSs 33 within the same bucket 91. Thus, for example, if there are 100 DSSs 33 having storage capacities 69 around 90 TB (or with storage capacities within a range of 82.5-97.5 TB), then the 90 TB bucket 91 will include the 95 of those 100 DSSs 33 which have the lowest FE write speeds 87 (i.e., the DSSs 33 with the top 5 highest FE write speeds 87 are excluded), and only the BE write speeds 89 from those 95 DSSs 33 will be considered in calculating the average 89. In some embodiments, not all of the BE write speeds 89 from those 95 DSSs 33 will be considered in calculating the average 89; rather, only a subset of those values will be included in the average, such as the top 20%. In this example, the top 20% of the bottom 95% is a 19% range, so the average 89 will be computed over 19 DSSs 33.

The initial configuration parameters 38 may include, for example, a capacity 73 for the new DSS 36, a metadata (MD) configuration 74 for the new DSS 36, a garbage collection (GC) configuration 75 for the new DSS 36, a deduplication configuration 76 for the new DSS 36, a compression configuration 77 for the new DSS 36, and a RAID configuration 78 for the new DSS 36. The capacity 73 may be based on the initial number 39 of storage drives in the new design 37. The MD configuration 74 is a complex configuration of how data is stored within the new design 37. For example, MD may be stored in a MD tree to locate user data.

The GC configuration 75 is a complex configuration that determines the cost of reclaiming free space; a process commonly referred to as garbage collection or cleaning within the new design 37. In a log-structured DSS, the storage is divided up into large, fixed-sized segments. New, non-contiguous writes are packed together and written as a single large segment write using MD to track the new location of each write. Overwrites never update in-place. Instead, the data is written to a new segment leaving "holes" where the old data resided. Over time, the segments become fragmented. The DSS reclaims the fragmented free space by compacting the remaining "live" data, providing adequate space to continue writing into segments. This garbage collection requires additional bytes or blocks to be read and written. The GC configuration 75 defines the write cost that such garbage collection incurs.

The deduplication configuration 76 defines how blocks of user data at different logical addresses that contain the same data can be deduplicated so that the duplicate data is not stored multiple times. Techniques for how this deduplication is performed may be summarized within the deduplication configuration 76.

The compression configuration 77 defines how blocks of user data are compressed. For example, particular compression algorithms that are used may be summarized within the compression configuration 77.

The RAID configuration 78 defines how storage drives of the new design 37 are utilized to store data and/or parity. The RAID configuration 78 may define a RAID level and a ratio of data to parity. The RAID configuration 78 may also indicate whether mapped RAID techniques are used to spread relatively small RAID stripes across a large group of storage drives. For example, one RAID configuration 78 may specify that RAID-6 may be used with mapped RAID such that each RAID stripe has 8 data disks and 2 parity disks, but the RAID stripes are spread out over 25 total storage drives.

The configuration parameters 38 may be used to generate the values 81, 82, 83, 84, 85. For example, a data reduction ratio (DRR) approximation 81 may be calculated by deriving an average compression ratio implied by the compression configuration 77 and deriving an average deduplication ratio implied by the deduplication configuration 76 and then multiplying the average compression ratio by the average deduplication ratio. If, for example, the average compression ratio and the average deduplication ratio are both 50%, then the DRR approximation 81 would be 0.25.

As another example, the parity ratio 82 may be calculated from the RAID configuration 78. For example, if RAID-6 is used with 8 data disks and 2 parity disks, then for every 8 bytes of user data that is written, 10 bytes need to be stored to disk due to the parity, so the parity ratio is 1.25.

As another example, the segment utilization approximation 83 may be calculated based on the GC configuration 75. For example, in an example new design 37, the GC configuration 75 may be tuned so that at steady-state, garbage collection is performed to keep the storage usage at approximately 70% of the capacity 73.

As another example, the expected data WAF 84 may be calculated using the DRR approximation 81, the parity ratio 82, and the segment utilization approximation 83. In one embodiment, the DRR approximation 81 may be multiplied by the parity ratio 82 and then divided by an emptiness approximation. The emptiness approximation is equal to 1 minus the segment utilization approximation 83. Thus, for example, if the DRR approximation 81 is 0.25, the parity ratio 82 is 1.25, and the segment utilization approximation 83 is 0.7, then the expected data WAF 84 may be calculated as 0.25×1.25/(1−0.7)≈1.04. That means that, on average, for every byte of user data written by a host 31, approximately 1.04 bytes of data (excluding MD) will be written to storage over the lifetime of the new DSS 36.

As another example, the expected size-specific MD WAFs 85 may be calculated using the MD configuration 74, and, in some embodiments, also the parity ratio 82 and the segment utilization ratio 83. As an example, the 1-KB MD WAF 82(*a*) may be 10.1, the 2-KB WAF 82(*b*) may be 5.0, the 4-KB WAF 82(*c*) may be 2.52, the 8-KB WAF 82(*d*) may be 1.26, the 16-KB WAF 82(*e*) may be 0.62, the 32-KB WAF 82(*f*) may be 0.31, the 64-KB WAF 82(*g*) may be 0.015, the 128-KB WAF 82(*h*) may be 0.071, and the 256-KB WAF 82(*i*) may be 0.034. In some embodiments, the value of a WAF(X) is approximately half of the WAF(X−1), although there may be some variation.

Configuration Evaluator 66 may calculate the per-DSS WAF 88 by first calculating a FE write speed for the writes 50 of particular sizes for a DSS. Thus, for example, with reference to DSS 33(4) in the earlier example, the 1-KB FE write speed is 100,000,000×1 KB/340 days≈3.4 KB/s and the 2-KB FE write speed is 85,000,000×2 KB/340 days≈5.78 KB/s. Continuing in the example, if the number of 4-KB writes 72(*c*) were 20,935,000,000, then the 4-KB FE write speed would be 20,935,000,000×4 KB/340 days≈2.78 MB/s. If the numbers of 8-KB, 16-KB, 32-KB, and 64-KB writes were all zero, and the number of 128-KB writes were 116,281,958,400, then the 128-KB FE write speed would be 116,281,958,400×128 KB/340 days≈494.8 MB/s. The sum of these FE write speeds, 3.4 KB/s+5.78 KB/s+2.78 MB/s+494.8 MB/s≈497.58 MB/s, which is equal to about 41 TB/day, which is the FE write speed 87 for DSS 33(4).

Once the FE write speeds are calculated for the various write sizes, those FE write speeds can then be used to weight the expected size-specific MD WAFs 85 in calculating a weighted average for all the MD. Thus, the weights are 0.00000667, 0.0000113, 0.00559, and 0.9944. Applying the weights to the expected size-specific MD WAFs 85(*a*), 85(*b*), 85(*c*), 85(*h*), the total MD WAF≈0.00000667×10.1+0.0000113×5.0+0.00559×2.52+0.9944×0.071≈0.08. Adding the MD WAF to the expected data WAF 84 of 1.04 yields the total WAF 88 of 1.12 for DSS4. Multiplying the WAF 88 by the FE write speed 87 yields the BE write speed 89 for DSS4 of 41 TB/day×1.12=45.92 TB/day.

Configuration Evaluator 66 may calculate the modeled number of DWPD 44 for the new design 37 by determining which bucket 91 of the bucketed DB 90 the new DSS 36 would fit into based on its capacity 73, reading the average BE write speed 92 for that capacity 73, and calculating the number of DWPD 44 by dividing the average BE write speed 92 for that capacity 73 by the capacity 73. Configuration Evaluator 66 can then compare the modeled number of DWPD 44 to the threshold DWPD value 46 for the new design 37. If the compare the modeled number of DWPD 44 is less than the threshold DWPD value 46, then the new design 37 is sound and the new DSS 36 can enter service.

Otherwise, the new DSS 36 needs to be reconfigured. This may be accomplished by having the reconfigurator 67 modify the initial configuration parameters 38 to become updated configuration parameters 38' and then communicating the updated configuration parameters 38' to the new DSS 36 for reconfiguration into updated new DSS 36'.

Memory 64 may also store various other data structures used by the OS 65, configuration evaluator 66, reconfigurator 67, and various other applications and drivers. In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 is configured to store programs and data even while the configuration device 40 is powered off. The OS 65, configuration evaluator 66, reconfigurator 67, and various other applications and drivers are typically stored in this persistent storage portion of memory 40 so that they may be loaded into a system portion of memory 40 upon a system restart or as needed. The OS 65, configuration evaluator 66, reconfigurator 67, and various other applications and drivers, when stored in non-transitory form either in the volatile portion of memory 40 or in persistent portion of memory 40, each form a computer program product. The processing circuitry 36 running one or more applications thus forms a specialized circuit constructed and arranged to carry out the various processes described herein.

Figure 3:
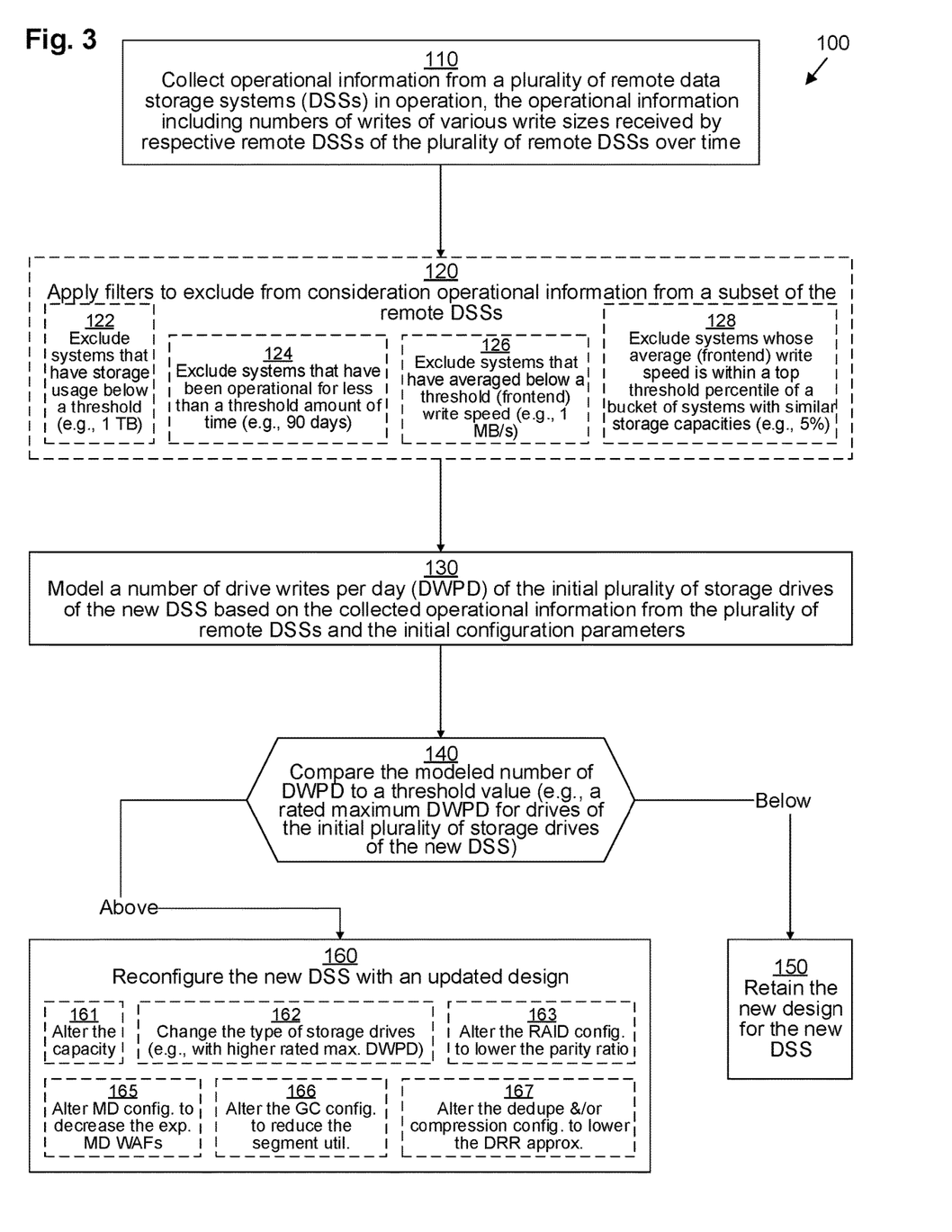
FIG. 3 is a flowchart depicting an example procedure according to various embodiments.

FIG. 3 illustrates an example method 100 performed by configuration device 40 for configuring a new DSS 36. It should be understood that any time a piece of software (e.g., the OS, configuration evaluator 66, reconfigurator 67, etc.) is described as performing a method, process, step, or function, what is meant is that a computing device (e.g., configuration device 40) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Certain steps and sub-steps are marked with dotted lines, indicating that they are either optional or alternatives.

In step 110, configuration device 40 collects operational information 42 from a plurality of remote DSSs 33 in operation, the operational information 42 (from telemetry 52) including numbers 72 of writes 50 of various write sizes received by respective remote DSSs 33 over time.

Then, in optional step 120, configuration evaluator 66 may apply filters 80 to exclude from consideration operational information 42 from a subset of the remote DSSs 33. In some embodiments, step 120 may include one or more sub-steps 122, 124, 126, 128. In sub-step 122, configuration evaluator 66 excludes DSSs 33 that have storage capacities 69 below a threshold size (e.g., 1 TB). In sub-step 124, configuration evaluator 66 excludes DSSs 33 that have been operational (read from the uptime 71 column) for less than a threshold amount of time (e.g., 90 days). In sub-step 126, configuration evaluator 66 excludes DSSs 33 that have averaged a threshold FE write speed 87 below a threshold speed (e.g., 1 MB/s). In sub-step 128, configuration evaluator 66 excludes DSSs 33 whose threshold FE write speed 87 is within a top threshold percentile of a bucket 91 of DSSs with similar storage capacities 69 (e.g., top 5%).

Then, in step 130, configuration evaluator 66 models a number of DWPD 44 of the initial plurality 39 of storage drives of the new DSS 36 based on the collected operational information 42 from the plurality of remote DSSs 33 in operation and the initial configuration parameters 38. Further detail with respect to step 130 is provided below in connection with FIG. 4.

Then, in step 140, configuration evaluator 66 compares the modeled number of DWPD 44 to a threshold value 46 (e.g., a rated maximum DWPD for drives of the initial plurality 39 of storage drives of the new DSS 36). If the modeled number of DWPD 44 is less than the threshold value 46, then operation proceeds to step 150, in which configuration evaluator 66 decides to retain the new design 37 for the new DSS 36 so that the new DSS 36 can enter service using the new design 37.

Figure 5:
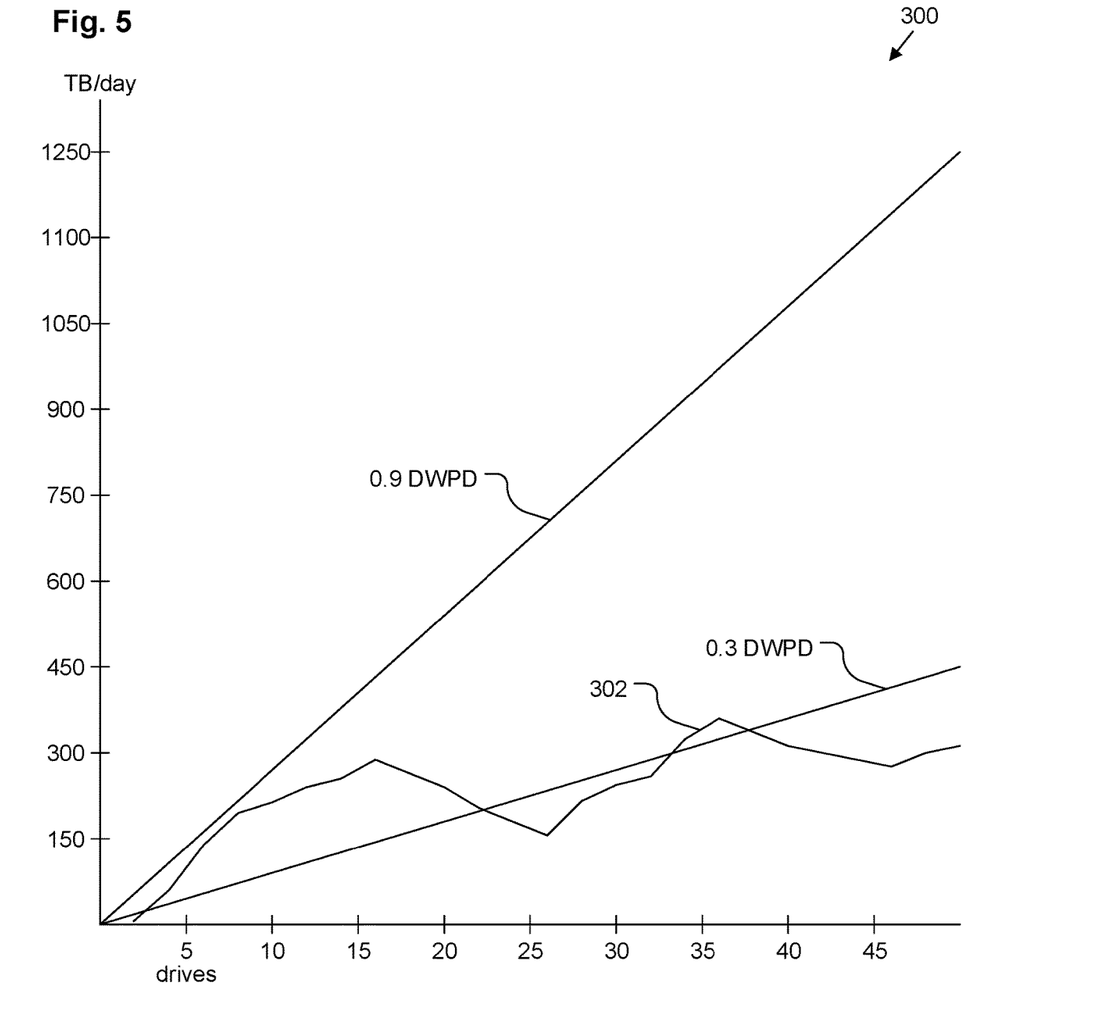
FIG. 5 is a graph depicting an example model generated according to various embodiments.

Otherwise, operation proceeds with step 160. In step 160, reconfigurator 67 reconfigures the new DSS 36 with an updated design 37'. In some embodiments, step 160 may include one or more sub-steps 161, 162, 163, 165, 166, 167. In sub-step 161, reconfigurator 67 alters the capacity 73 to updated capacity 73'. For example, with reference to FIG. 5, graph 300 illustrates a plot 302 of the BE write speed 89 (in TB/day) plotted against a number of 15 TB drives providing capacity 69, 73. The upper diagonal line represents a DWPD of 0.9, which is representative of a maximum DWPD rating for TLC drives that may be in use, for example, in the remote DSSs 33, while the lower diagonal line represents a DWPD of 0.3, which is representative of a maximum DWPD rating for QLC drives that may be in use in the new design 37 of the new DSS 36. As depicted, if the new design 37 of the new DSS 36 has 34-37 drives, then the modeled number of DWPD 44 would exceed the threshold value 46 of 0.3 DWPD. Reconfigurator 67 could alter the capacity 73 by changing to an updated plurality 39' of drives that either exceeds 37 drives or is between 23 and 32 drives. As an alternative, Reconfigurator 67 could instead perform sub-step 162, in which it changes the type of storage drives installed on the new DSS 36' to a type having a higher maximum DWPD rating.

In sub-step 163, reconfigurator 67 alters the RAID configuration 78 to updated RAID configuration 78' to lower the parity ratio 82. For example, instead of having 8 data drives and 2 parity drives, updated RAID configuration 78' could have 5 data drives and 1 parity drive for a parity ratio 82' of 1.2 instead of 1.25, which reduces the expected data WAF 84' by about 0.04, which should also reduce the WAF 88 by about 0.04, causing the BE write speed 89 to decrease, which would lower the modeled number of DWPD 44.

In sub-step 165, reconfigurator 67 alters the MD configuration 74 to updated MD configuration 74' to decrease the expected MD WAFs 85. In sub-step 166, reconfigurator 67 alters the GC configuration 75 to updated GC configuration 75' to reduce the segment utilization approximation 83. For example, this may result in the segment utilization approximation 83' being reduced to 0.67 instead of 0.7, which reduces the expected data WAF 84' by about 0.09, which should also reduce the WAF 88 by about 0.09, causing the BE write speed 89 to decrease, which would lower the modeled number of DWPD 44.

In sub-step 167, reconfigurator 67 alters the deduplication configuration 76 to updated deduplication configuration 76' and/or the compression configuration 77 to updated compression configuration 77' to lower the DRR approximation 81. For example, if the deduplication ratio and compression ratio are both decreased from 0.5 to 0.48, then the DRR approximation 81' is reduced to 0.23 instead of 0.25, which reduces the expected data WAF 84' by about 0.08, which should also reduce the WAF 88 by about 0.08, causing the BE write speed 89 to decrease, which would lower the modeled number of DWPD 44. If sub-steps 163, 166, and 167 are combined using the same example numbers, then the expected data WAF 84' is reduced by about 0.20, which should also reduce the WAF 88 by about 0.20, causing the BE write speed 89 to decrease, which would lower the modeled number of DWPD 44.

Figure 4:
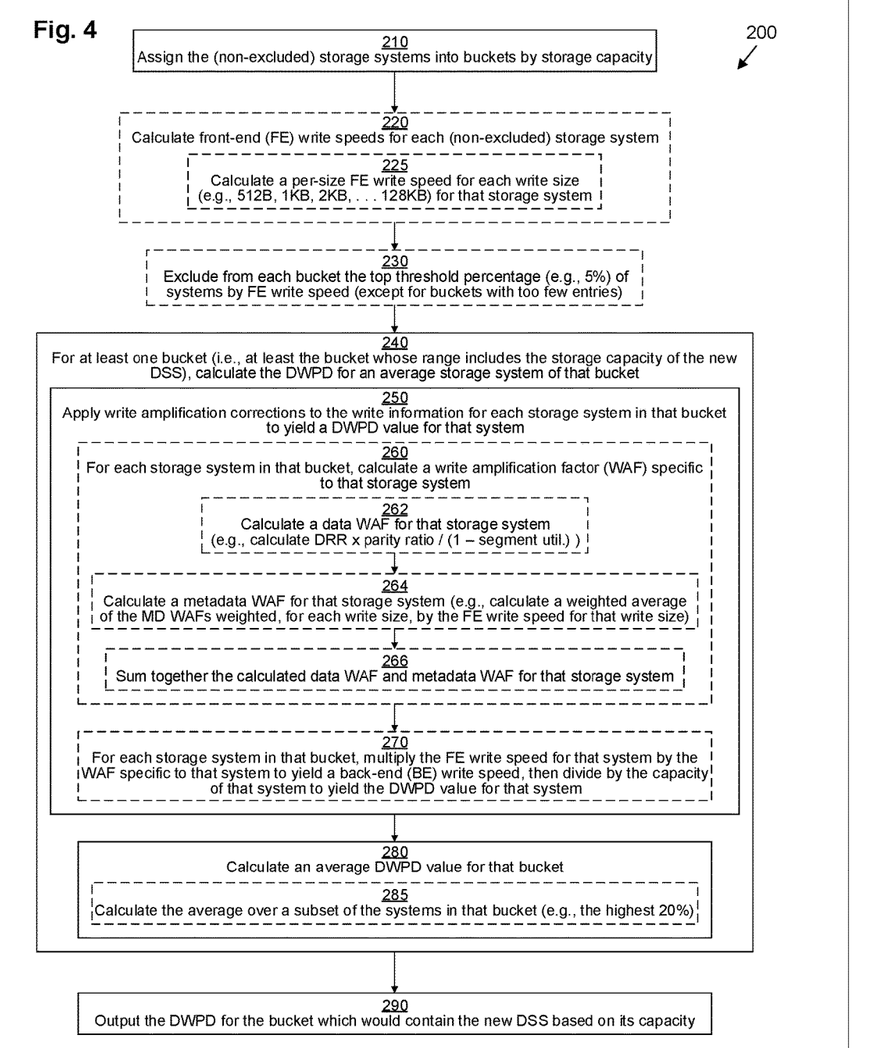
FIG. 4 is a sequence diagram depicting an example procedure according to various embodiments.

FIG. 4 depicts an example method 200 performed by configuration evaluator 66 to implement step 130.

In step 210, configuration evaluator 66 assigns the DSSs 33 (aside from those that were already excluded in step 120 of method 100) into buckets 91 based on their storage capacities 69. In one example embodiment, each bucket 91 is assigned to DSSs 33 having storage capacities 69 that are indicative of a different number of storage drives. Thus, if a typical DSS 33 uses 15 TB storage drives, then the buckets 91 are centered at 15 TB intervals (e.g., one bucket 91 centered at a capacity 69 of 90 TB, the next bucket 91 centered at a capacity 69 of 105 TB, the next bucket 91 centered at a capacity 69 of 120 TB, etc.).

In optional step 220, configuration evaluator 66 calculates a FE write speed 87 for each DSS 33 (aside from those that were already excluded in step 120 of method 100). In some embodiments, step 220 includes sub-step 225, in which configuration evaluator 66 calculates a per-size FE write speed for each write size (e.g., 512 B, 1 KB, 2 KB, 4 KB, 8 KB, 16 KB, 32 KB, 64 KB, 128 KB, 256 KB, 512 KB, 1 MB, 2 MB, or some subset of these) for a DSS 33.

In optional step 230, configuration evaluator 66 excludes from each bucket 91 the top threshold percentage (e.g., the top 5%) of DSSs 33 by FE write speed 87. In some embodiments, if there are too few entries in a bucket 91, then step 230 is skipped for that bucket 91. For example, for a threshold of 5%, step 230 would be skipped for any bucket 91 having fewer than 20 DSSs 33.

In step 240, for at least one bucket 91 (i.e., at least the bucket 91 whose range includes the storage capacity 73 of the new DSS 36), configuration evaluator 66 calculates the DWPD for an average storage system of that bucket 91. In some embodiments, step 240 may be performed for every bucket 91, while in other embodiments, step 240 is only performed for the bucket 91 whose range includes the storage capacity 73 of the new DSS 36.

Step 240 may be performed by performing sub-steps 250 and 280 for each of the at least one buckets 91.

In sub-step 250, configuration evaluator 66 applies write amplification corrections to the write information for each DSS 33 in that bucket 91 to yield a DWPD value for that DSS 33. In some embodiments, sub-step 250 includes sub-steps 260 and 270.

In sub-step 260, for each DSS 33 in that bucket 91, configuration evaluator 66 calculates a WAF 88 specific to that DSS 33. In some embodiments, sub-step 260 includes sub-steps 262, 264, and 266. In sub-step 262, configuration evaluator 66 calculates a data WAF for that DSS 33. In some embodiments, this is the same expected data WAF 84 used for all DSSs 33. In some embodiments, expected data WAF 84 may be calculated by multiplying the DRR approximation 81 by the parity ratio 82 and dividing by 1 minus the segment utilization approximation 83. In other embodiments, another formula may be used instead. In sub-step 264, configuration evaluator 66 calculates a metadata WAF for that DSS 33 (e.g., calculate a weighted average of the expected MD WAFs 85 weighted, for each write size, by the FE write speed for that write size that was calculated in sub-step 225). In sub-step 266, configuration evaluator 66 sums the data WAF from sub-step 262 with the metadata WAF for that DSS 33 from sub-step 264 to yield the overall WAF 88 specific to that DSS 33.

In sub-step 270, for each DSS 33 in that bucket 91, configuration evaluator 66 multiplies the FE write speed 87 for that DSS 33 by the WAF 88 specific to that DSS to yield the BE write speed 89. In some embodiments, configuration evaluator 66 then divides the BE write speed 89 by the capacity 69 of that DSS 33 to yield the DWPD value for that DSS 33.

In sub-step 280, configuration evaluator 66 calculates an average DWPD value or an average BE write speed 92 for that bucket 91. In some embodiments (sub-step 285), instead of averaging the DWPD values or BE write speeds 89 for every DSS 33 in the bucket 91, configuration evaluator 66 calculates the average only over a subset of the bucket 91 (e.g., only considering the highest 20% of DWPD values or BE write speeds 89 in the bucket 91).

Finally, in sub-step 290, configuration evaluator 66 outputs the DWPD value for the bucket 91 which would contain the new DSS 36 based on its capacity 73 as the modeled number of DWPD 44. Thus, for example, if the capacity 73 of the new DSS 36 is 90 TB, then with reference to the bucketed DB 90 of FIG. 2, configuration evaluator 66 outputs 67.86 TB/d/90 TB≈0.75 DWPD as modeled number of DWPD 44. As another example, if the capacity 73 of the new DSS 36 is 375 TB, then with reference to the bucketed DB 90 of FIG. 2, configuration evaluator 66 outputs 48.1 TB/d/375 TB≈0.128 DWPD as modeled number of DWPD 44.

Thus, techniques have been presented techniques for utilizing telemetry 52 from existing storage systems 33 in the design and configuration of new data storage systems 36. Such use of telemetry may include creating a model of real-world usage patterns based on the telemetry 52 using design parameters 38 from a new data storage system 36. The model may be used to determine whether a particular configuration 38 of the new data storage system 36 can meet a threshold DWPD value 46. If not, the model may be operated to generate a new configuration 38' or a new design 37' for the new data storage system 36'. In some embodiments, the model assumes write patterns similar to those from storage systems 33 of similar storage capacity 69 as the new data storage system 36 as tentatively configured. In some embodiments, the model calculates and applies write amplification corrections based on a design of the new data storage system 36.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method, performed by a computing device, of configuring a new design of a new data storage system (DSS) having initial configuration parameters, the new design including an initial plurality of storage drives, the method comprising:
    collecting operational information from a plurality of remote DSSs in operation, the operational information including numbers of writes of various write sizes received by respected remote DSSs of the plurality of remote DSSs over time;
    modeling a number of drive writes per day (DWPD) of the initial plurality of storage drives of the new DSS based on the collected operational information from the plurality of remote DSSs and the initial configuration parameters;
    comparing the modeled number of DWPD to a threshold value; and
    in response to the modeled number of DWPD exceeding the threshold value, reconfiguring the new DSS with an updated design.

2. The method of claim 1 wherein the initial configuration parameters include an initial storage capacity, and modeling includes:
    grouping remote DSSs of the plurality of remote DSSs into buckets based on their respective storage capacities; and
    calculating an average DWPD value for the remote DSSs that are within a bucket A that includes the initial storage capacity.

3. The method of claim 2 wherein calculating the average DWPD value includes:
    determining DWPD values for the remote DSSs that are within the bucket;
    identifying a first subset of the determined DWPD values that are all higher than those of a second subset; and
    averaging the first subset of the determined DWPD values.

4. The method of claim 2 wherein calculating the average DWPD value includes determining DWPD values for the remote DSSs that are within the bucket by applying write amplification corrections to the operational information for the remote DSSs that are within the bucket, the write amplification corrections being based on the initial configuration parameters.

5. The method of claim 4 wherein applying write amplification corrections to a remote DSS includes:
    calculating a per-remote-DSS write amplification factor (WAF) for that remote DSS; and
    multiplying the per-remote-DSS WAF by a write speed derived from the numbers of writes of various write sizes received by that remote DSS.

6. The method of claim 5 wherein calculating the per-remote-DSS WAF includes multiplying an expected data reduction ratio derived from the initial configuration parameters by a parity ratio derived from the initial configuration parameters.

7. The method of claim 5 wherein calculating the per-remote-DSS WAF includes calculating a weighted average of a set of per-write-size WAFs derived from the initial configuration parameters, each per-write-size WAF weighted by a speed of writes of a respective write size received by that remote DSS derived from the numbers of writes of various write sizes received by that remote DSS.

8. The method of claim 1 wherein the method further comprises excluding operational information of remote DSSs from the collected operational information by applying one or more filters.

9. The method of claim 8 wherein applying the one or more filters includes excluding operational information of remote DSSs whose operational information indicates a storage usage below a threshold minimum storage usage value.

10. The method of claim 8 wherein applying the one or more filters includes excluding operational information of remote DSSs whose operational information indicates that they have been in operation for less than a threshold amount of time.

11. The method of claim 8 wherein applying the one or more filters includes excluding operational information of remote DSSs whose operational information indicates a speed of writes received by that remote DSS that is below a threshold minimum write speed.

12. The method of claim 8 wherein applying the one or more filters includes:
    grouping remote DSSs of the plurality of remote DSSs into buckets based on their respective storage capacities; and
    excluding operational information of remote DSSs whose operational information indicates a speed of writes received by that remote DSS as being within a top threshold percentile in comparison to the speeds of writes received by all remote DSSs grouped into a same bucket.

13. The method of claim 1 wherein reconfiguring the new DSS includes modifying the new design to an updated design including an updated plurality of storage drives different than the initial plurality of storage drives.

14. The method of claim 13 wherein reconfiguring the new DSS includes modifying the new design to an updated design including a different RAID configuration than the new design.

15. The method of claim 13 wherein reconfiguring the new DSS includes modifying the new design to an updated design including updated configuration parameters different than the initial configuration parameters, the updated configuration parameters indicating an updated metadata configuration different than an initial metadata configuration, the updated metadata configuration being associated with a lower write amplification factor than the initial metadata configuration.

16. The method of claim 13 wherein reconfiguring the new DSS includes modifying the new design to an updated design that has updated configuration parameters different from the initial configuration parameters, the updated configuration parameters indicating updated data reduction configuration information different from initial data reduction configuration information, the updated data reduction configuration information being associated with a lower write data reduction ratio than the initial data reduction configuration information.

17. The method of claim 1 wherein:
the new design includes the initial plurality of storage drives being of a first type of storage drive; and
reconfiguring the new DSS includes modifying the new design to an updated design including the initial plurality of storage drives including a second type of storage drive different than the first type of storage drive.

18. The method of claim 17 wherein:
the threshold value is equal to a maximum rated DWPD value of the first type of storage drive; and
a maximum rated DWPD value of the second type of storage drive exceeds the maximum rated DWPD value of the first type of storage drive.

19. An apparatus comprising:
network interface circuitry connected to a network; and
processing circuitry coupled to memory constructed and arranged to configure a new design of a new data storage system (DSS) having initial configuration parameters, the new design including an initial plurality of storage drives, by:
collecting operational information from a plurality of remote DSSs in operation via the network interface circuitry, the operational information including numbers of writes of various write sizes received by respective remote DSSs of the plurality of remote DSSs over time;
modeling a number of drive writes per day (DWPD) of the initial plurality of storage drives of the new DSS based on the collected operational information from the plurality of remote DSSs and the initial configuration parameters;
comparing the modeled number of DWPD to a threshold value; and
in response to the modeled number of DWPD exceeding the threshold value, reconfiguring the new DSS with an updated design.

20. A computer program product comprising a non-transitory computer-readable storage medium storing instructions, which, when performed by processing circuitry of a computing device, cause the computing device to configure a new design of a new data storage system (DSS) having initial configuration parameters, the new design including an initial plurality of storage drives, by:
collecting operational information from a plurality of remote DSSs in operation, the operational information including numbers of writes of various write sizes received by respective remote DSSs of the plurality of remote DSSs over time;
modeling a number of drive writes per day (DWPD) of the initial plurality of storage drives of the new DSS based on the collected operational information from the plurality of remote DSSs and the initial configuration parameters;
comparing the modeled number of DWPD to a threshold value; and
in response to the modeled number of DWPD exceeding the threshold value, reconfiguring the new DSS with an updated design.

\* \* \* \* \*